(12) United States Patent
Ottelli

(10) Patent No.: US 6,732,754 B2
(45) Date of Patent: May 11, 2004

(54) VALVE GROUP FOR SUPPLY AND CONTROL OF HOT, COLD AND MIXED WATER FLOW

(75) Inventor: Carlo Ottelli, Lumezzane (IT)

(73) Assignee: Sitec S.R.L., Brescia (IT)

( * ) Notice: Subject to any disclaimer, the term of this patent is extended or adjusted under 35 U.S.C. 154(b) by 106 days.

(21) Appl. No.: 10/060,507

(22) Filed: Jan. 30, 2002

(65) Prior Publication Data

US 2002/0100510 A1 Aug. 1, 2002

(51) Int. Cl.$^7$ .......................... G05D 11/16; F16K 27/00
(52) U.S. Cl. ..................... 137/100; 137/271; 137/454.6
(58) Field of Search ........................ 137/98, 100, 454.2, 137/454.6, 625.17, 625.4

(56) References Cited

U.S. PATENT DOCUMENTS

| | | | | |
|---|---|---|---|---|
| 962,111 A | * | 6/1910 | Assmann | 137/100 |
| 2,470,025 A | * | 5/1949 | Fraser | 137/100 |
| 3,135,280 A | * | 6/1964 | Kozel | 137/100 |
| 3,182,677 A | * | 5/1965 | Thiem | 137/98 |
| 3,938,556 A | * | 2/1976 | Hicks | 137/636.4 |
| 4,033,370 A | * | 7/1977 | Egli | 137/100 |
| 4,981,156 A | * | 1/1991 | Nicklas et al. | 137/270 |
| 5,299,593 A | * | 4/1994 | Ottelli | 137/100 |
| 5,355,906 A | * | 10/1994 | Marty et al. | 137/98 |
| 5,425,394 A | * | 6/1995 | Clare | 137/270 |
| 5,501,244 A | * | 3/1996 | Shahriar | 137/98 |
| 5,725,010 A | * | 3/1998 | Marty et al. | 137/100 |
| 5,826,611 A | * | 10/1998 | Ko | 137/100 |

* cited by examiner

Primary Examiner—John Rivell
(74) Attorney, Agent, or Firm—McGlew and Tuttle, P.C.

(57) ABSTRACT

This invention relates to a group of valve components to regulate the flow of water in hot and cold water mixer taps, which comprises a mixer valve with a cartridge type body provided with reference pins and is intended to be housed, superimposed and in association with at least a pressure regulator, in a tap body. The superimposed mixer valve (10) and al least pressure regulator (11) are assembled together by fastening screws (14, 16, 19, 111') in order to form a block to be inserted into/removed from the tap body as a single group.

9 Claims, 5 Drawing Sheets

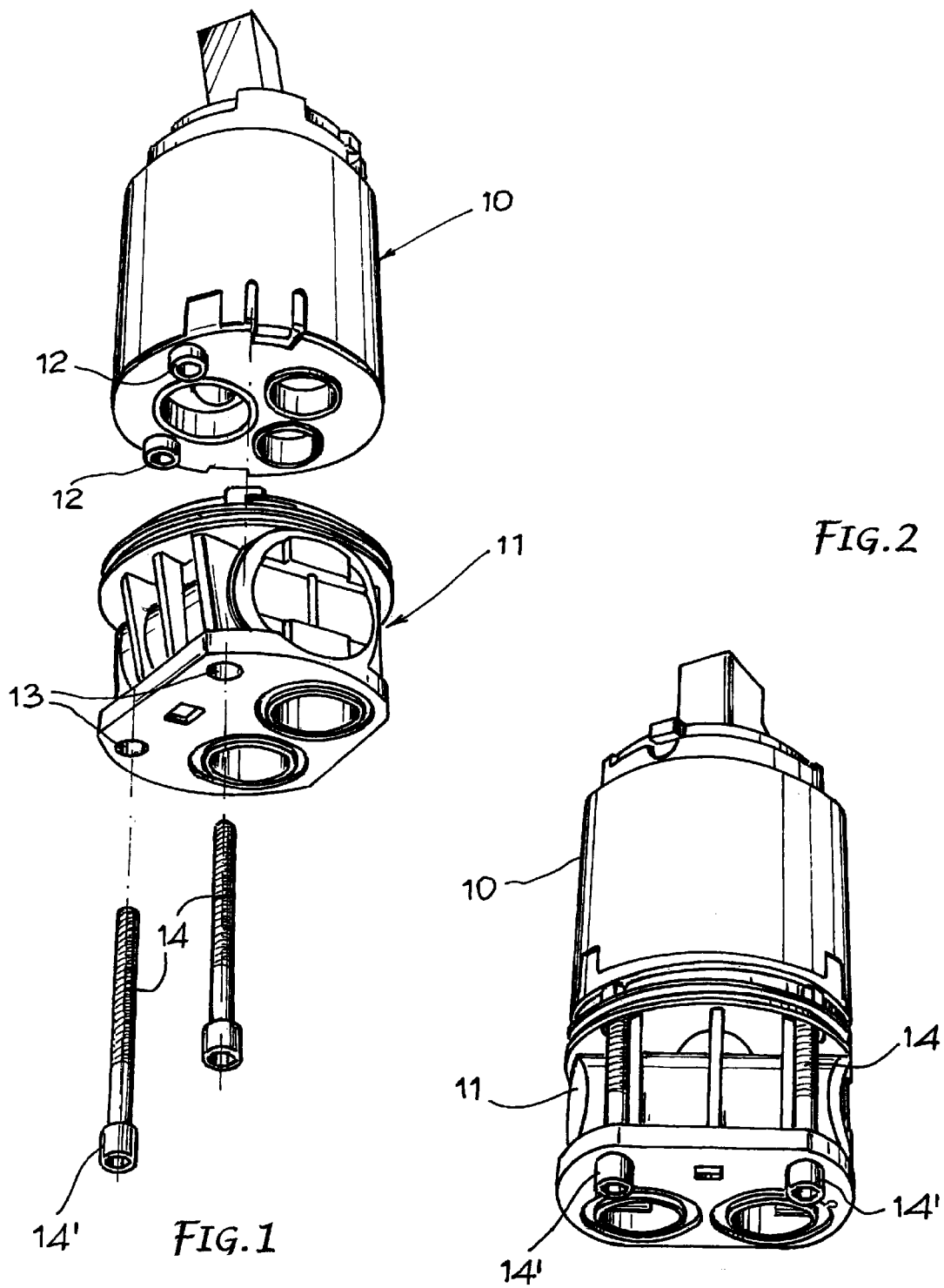

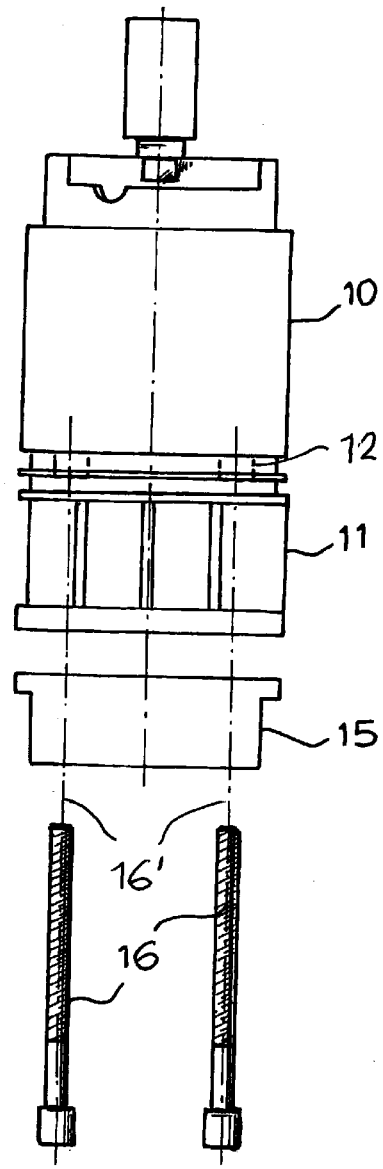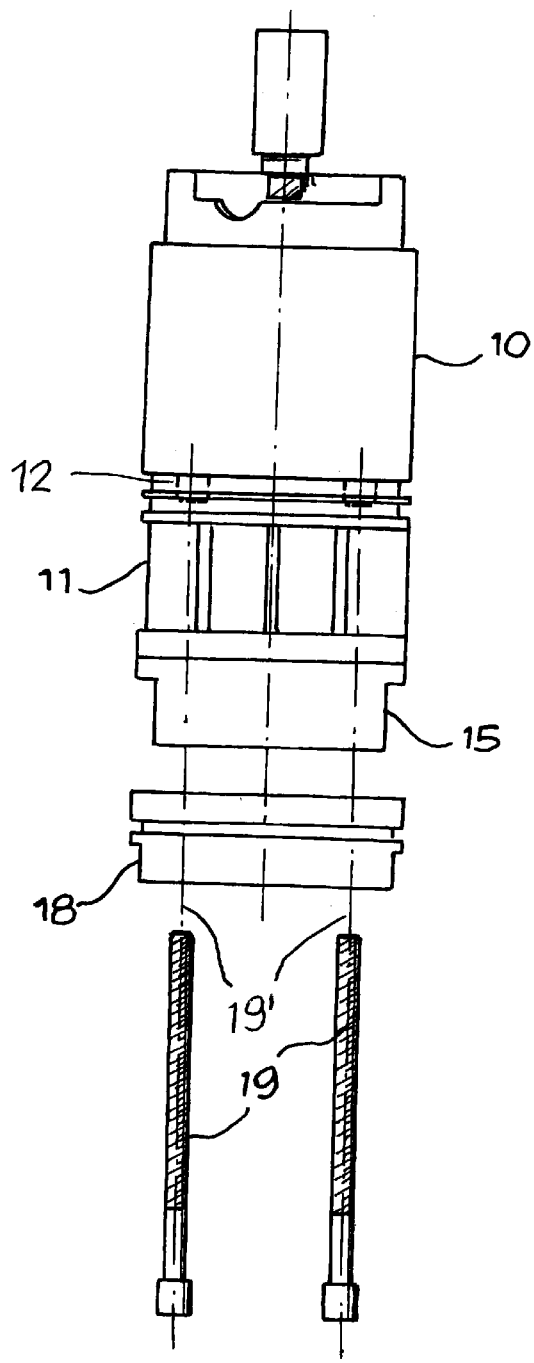
FIG.3
FIG.4

US 6,732,754 B2

VALVE GROUP FOR SUPPLY AND CONTROL OF HOT, COLD AND MIXED WATER FLOW

FIELD OF INVENTION

The present invention concerns the tapware sector and refers in particular to a group of two or more components, such as a mixer valve and a pressure regulator, to control the flow of water in hot and cold-water mixer taps.

STATE OF THE ART

Taps to select a flow of hot, cold or mixed water usually include a body which houses a mixer valve which can be connected to a pressure regulator. The mixer valve usually has a cartridge with two reference pins for fitting into the tap body, and the pressure regulator is positioned separately, below the mixer valve with a fluid connection to the latter. Furthermore a non-return valve and possibly a hot and cold water flow inverter, depending on needs, can be placed at the water influxes of the pressure regulator. All these components are separate and are inserted and placed one at a time into the body of the tap. This assembly method is however unfavourable above all when the tap requires maintenance. In fact, the components placed below the cartridge may become jammed in the tap body and become difficult to access or remove. Whatever the case, the components must always be manipulated and disassembled individually.

The tendency at present to facilitate assembly and disassembly is to have the components enclosed in a single block making them jointly accessible. In order to meet this need a cartridge containing both a mixer valve and a pressure regulator housed in the same body has already been addressed, but with the disadvantage however that should there be a fault in one of the components, the other has to be sacrificed as well.

OBJECTS AND SUMMARY OF THE INVENTION

The object of the present invention is to correct the inconveniences of in the prior art and to provide a group of components, which are normally independent and physically separated, pre-assembled to form an assembly which can be inserted and removed simply as one unit from the body of a tap, without, above all, having to modify the normal structure and operating method of each component and with the possibility when needed of separating and replacing a component without this effecting the others.

The object is achieved by superimposing and assembling as a pack at least a mixer valve and a pressure regulator and screwing them together before inserting them in the body of the tap.

In accordance with a particular way of execution, two or more superimposed components, such as a mixer valve, a pressure regulator, non-return valves and/or a flow inverter, are superimposed and screwed together, the heads of the screws acting as references for correct positioning of the resulting group in the body of the tap.

According to another way of execution of the invention, at least two components, such as a mixer valve and a pressure regulator, each with its own casing, are assembled by forming the body of the pressure regulator to receive and enclose the mixer valve. In this way the mixer valve and pressure regulator form a single accessible and easily insertable/removable block in a tap body.

The pressure regulator may be one of any of the known types, but according to another aspect of the invention it is an improved piston regulator.

BRIEF DESCRIPTION OF THE DRAWINGS

Further details of the invention will become evident from the following description made in reference to the enclosed indicative but not limiting drawings, in which:

FIG. 1 is a view in prospective of a separate mixer valve and a pressure regulator;

FIG. 2 is a view in prospective of a pre-assembled mixer valve and pressure regulator;

FIG. 3 is a schematic view of a mixer valve, pressure regulator and non-return valve before being screwed together;

FIG. 4 is a schematic view of a mixer valve, pressure regulator, non-return valve and flow inverter before being screwed together;

DETAILED DESCRIPTION OF THE INVENTION

Figure 5:
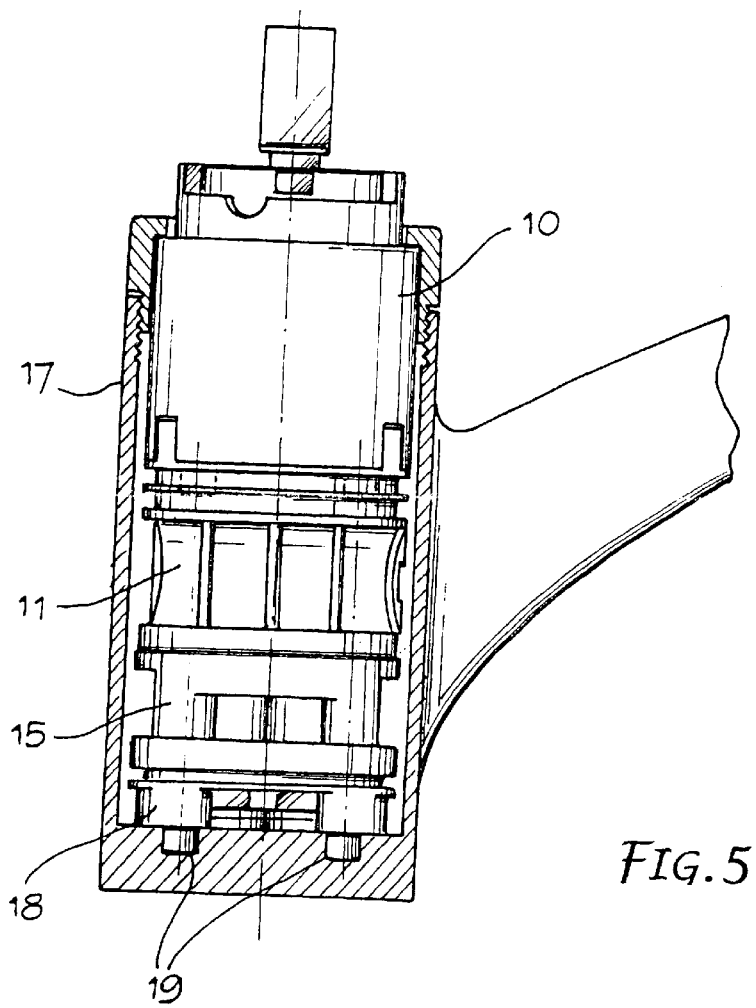
FIG. 5 is a cross-section of the group in FIG. 4 when assembled and inserted into the tap body.

In said drawings, FIGS. 1 and 2 show a mixer valve with a cartridge body 10, and a pressure regulator body 11, both well-known types, allocated to be superimposed. The cartridge type body 10 houses the means of control of the water flow and usually has a pair of reference pins 12. The pressure regulator 11 has a through hole 13 in line with each of these pins. When the two components are superimposed, they can be locked together using self-tapping screws 14 inserted from the bottom into the holes 13 in the regulator body as far as the pins 12 in the cartridge type body that they screw into. The screws 14 screw into holes provided in the pins or they can be the type that screw onto the outside surface of the pins themselves. The heads 14' of the screws 14 protrude from the bottom of the pressure regulator body acting also as reference marks for correct positioning of the resulting mixer valve-pressure regulator group in a tap body 17.

FIG. 3 shows a mixer valve 10, a pressure regulator 11 and a body 15 incorporating, in the well-known way, a pair of non-return valves. The three components 10, 11 and 15 are superimposed and can also be assembled as a pack with a pair of self-tapping screws 16 inserted from the bottom into holes formed in the body 15 of the non-return valves and in the body 11 of the pressure regulator 11 until they reach the pins 12 of the mixer valve body which they screw into according to the 16' axes.

A body 18 incorporating, in the well-known way, a cold and hot water flow inverter—FIG. 4—can also be added to the group of components illustrated in FIG. 3 Also in this case the four components 10, 11, 15 and 18 can be assembled as a pack with a pair of self-tapping fastening screws 19 inserted from the bottom into coinciding holes formed according to the 19' axes in the bodies of the components positioned below the cartridge body 10 of the mixer valve so as to screw into the pins 12 of the latter. The heads of the fastening screws 16, 19 are left to protrude from the base of the bottom body 15 or 18 to act as reference points for positioning in the body 17 of a tap.

In this way, two, three or four components are pre-assembled, handled as a single unit and can be inserted and removed from the tap body as a single block with or without any interposition of a diametrical adapter bushing, not shown.

Figure 6:
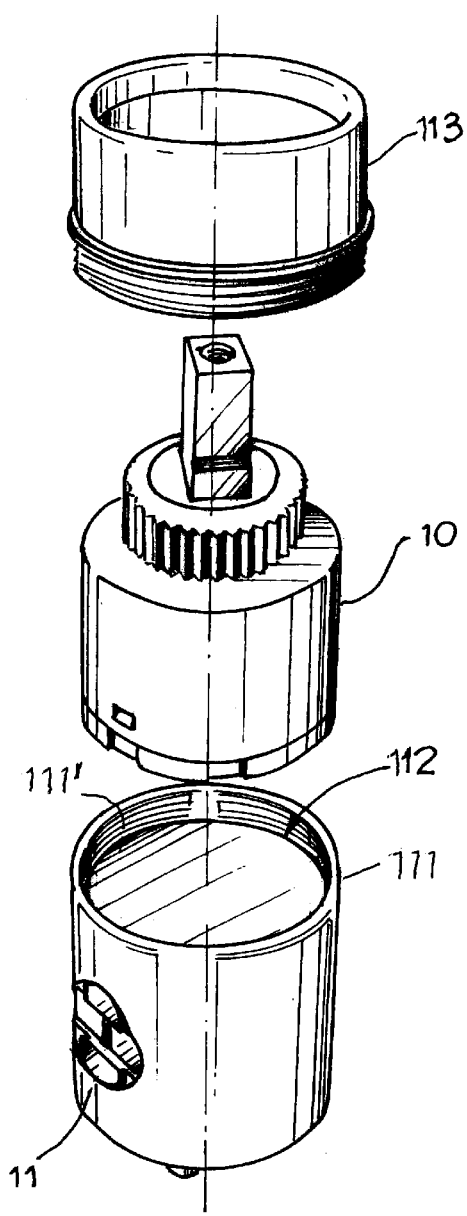
FIG. 6 is a view in prospective of a separated mixer valve and a pressure regulator body.
Figure 7:
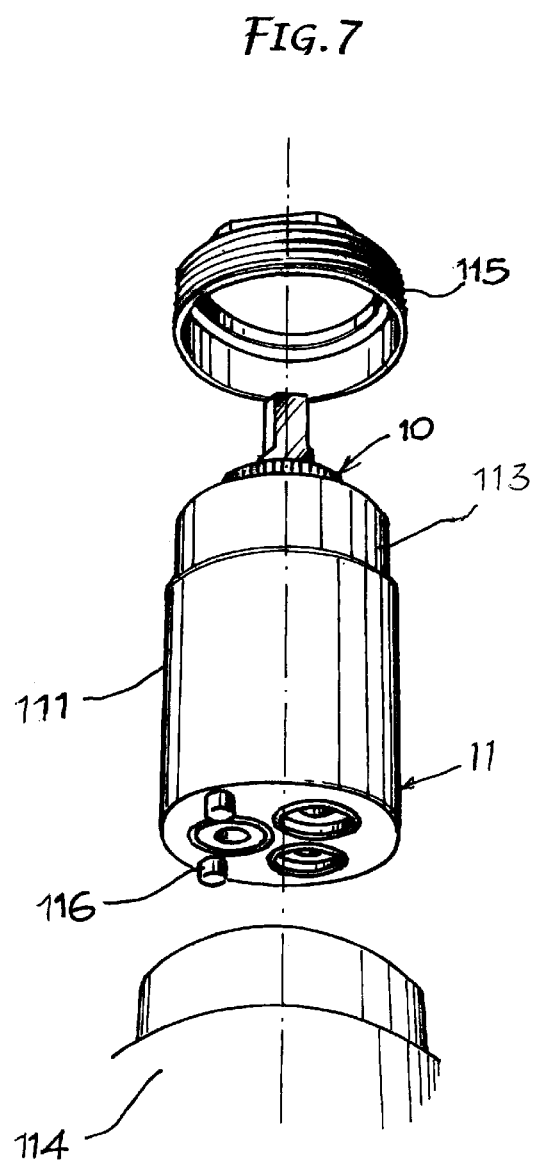
FIG. 7 is a view in prospective of a pre-assembled mixer valve and a pressure regulator.
Figure 8:
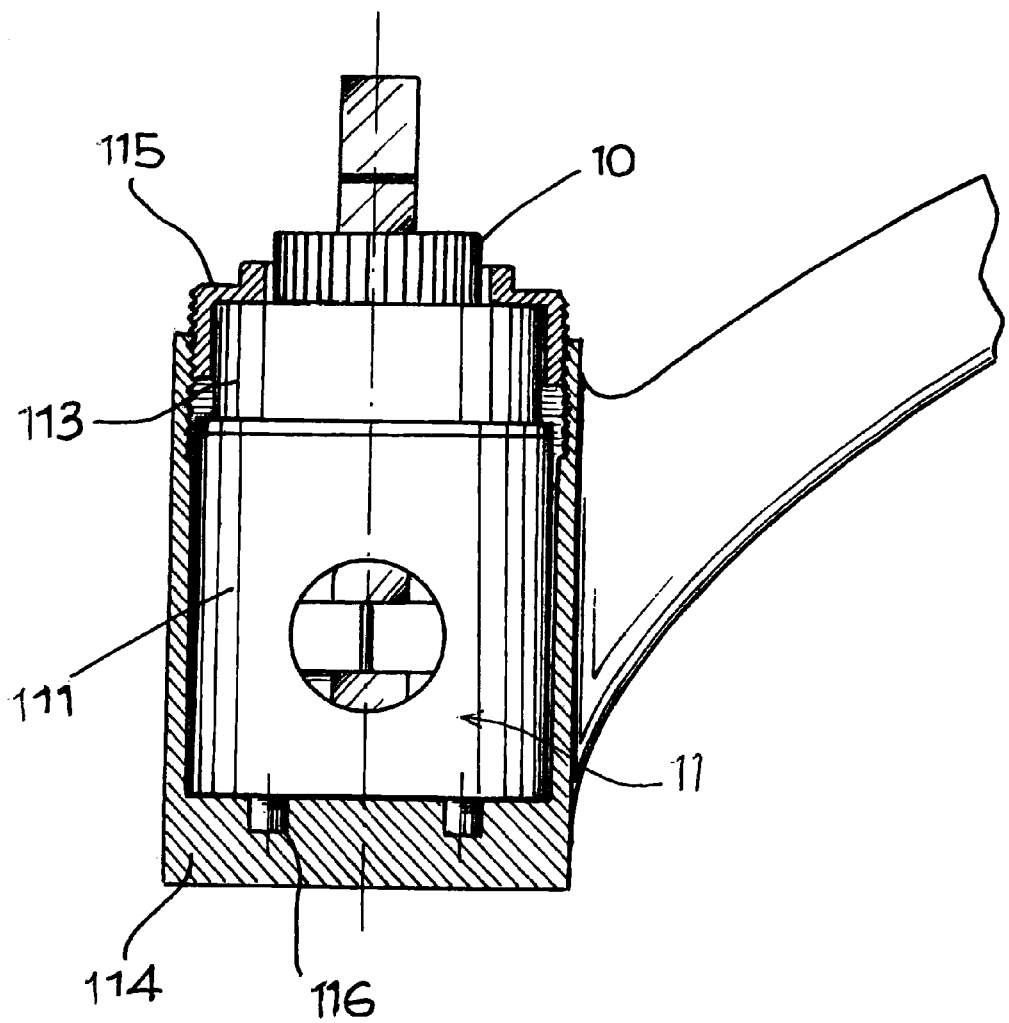
FIG. 8 is a section of the group in FIG. 7 inserted into the tap body.

In FIGS. 6–8 number 10 indicates a cartridge body of a mixer valve and number 11 the body of a pressure regulator. In this execution, the body 11 of the pressure regulator has a ring extension 111 shaped to enclose a housing 112 made to receive the cartridge body 10 of the mixer valve when the two components 10 and 11 are assembled together. The extension 111 of the regulator body 11 has a threaded section 111' and the mixer valve 10 is locked in the housing 112 by a ring nut 113 which screws onto the threaded section 111' of the regulator body.

The mixer valve and the pressure regulator pre-assembled in this way form a monolithic cartridge operated group, which can be inserted into a tap body 114 where it is locked in the usual way by a ring nut 115—FIG. 8. For correct positioning of said group in the tap body 114, the base of the body 111 of the regulator is provided with reference pins 116.

It should be pointed out that the extension 111 of the body 11 of the pressure regulator can be dimensioned so as to contain non-return valves and, if needed, a hot and cold water flow inverter.

Figure 9:
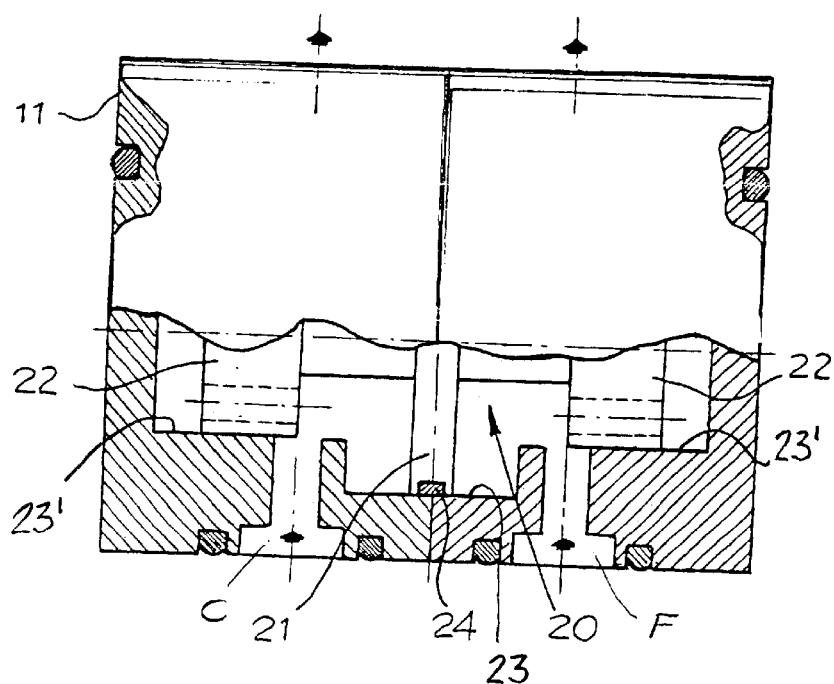
FIG. 9 is a cross-section of an example of a piston pressure regulator according to the invention.

Any type of pressure regulator 11 can be used, but preference should be given to a piston pressure regulator with an input for cold water F and an input for hot water C, as shown in FIG. 9. In this execution, the regulator piston 20 ha an intermediate circular flange 21 with a larger diameter compared to two symmetric lateral circular flanges 22. The intermediate flange 21 moves in a seat 23, defined by a possible anti-friction bushing, positioned between the two cold and hot water inputs F and C, respectively, whereas the lateral flanges 22 slide on their respective seats 23' placed externally so said two water inputs F and C. The intermediate flange 21 slides in its respective seat 23 with interposition of an -O-ring sealing 24 which stops water flowing from the hot water chamber into the cold water chamber and vice versa, thus avoiding the use of non-return valves.

What is claimed is:

1. A group of valve components to regulate the flow of water in hot and cold water mixer taps, the group of valve components comprising: a mixer valve with a cartridge type body provided with reference pins and intended to be housed, superimposed and in association with at least a pressure regulator, in a tap body, wherein the superimposed mixer valve and pressure regulator are assembled together by fastening screws forming a block to be inserted into/removed from the tap body as a group.

2. A group of valve components according to claim 1, further comprising: non-return valves in the tap body wherein the superimposed mixer valve, pressure regulator and non-return valves are assembled by fastening means to form a block to be inserted into and removed from the tap body as a group.

3. A group of valve components according to claim 1, further comprising non-return valves and a hot and cold water flow inverter in the tap body, and wherein the superimposed mixer valve, pressure regulator non-return valves and flow inverter are assembled by means of fastening to form a block to be inserted into/removed from the tap body as a group.

4. A group of valve components according to claim 2, wherein said fastening means is made up of a pair of self-tapping screws inserted into respective longitudinal holes formed in the body of each component placed below the cartridge body of the mixer valve and which screw into the pins of said cartridge body, the heads of said screws protruding from the base of the bottom body to act as a reference when positioning the group of components in the tap body.

5. A group of components according to claim 1, wherein each of the mixer valve and the pressure regulator have a body intended to be housed in the tap body, and wherein the pressure regulator has a body shaped to receive and incorporate the mixer valve forming a block to be inserted into/removed from the tap body as a group.

6. A group of components according to claim 5, wherein the pressure regulator body defines a housing to receive at least partially the mixer valve, the pressure regulator body being equipped with a ring nut to block the mixer valve in said housing.

7. A group of components according to claim 6, wherein the pressure regulator body has reference pins for positioning in the tap body.

8. A group of components according to claim 5, including also non-return valves and/or a flow inverter in association with the pressure regulator in said housing intended to receive and incorporate the mixer valve.

9. A group of components according to claim 1, wherein the pressure regulator is the piston type and includes a body with separate inlets for cold and hot water, and wherein the piston has an intermediate circular flange separated by two symmetric circular end flanges, the diameter of the intermediate flange being larger than the end flanges, and said intermediate flange has a peripheral seal and slides in a seat placed between said two cold water and hot water entrances, whereas the two end flanges slide in seats externally to said entrances.

* * * * *